United States Patent [19]

Tucker et al.

[11] 4,238,056
[45] Dec. 9, 1980

[54] SOAP DISPENSER HAVING A PIVOTABLE DISPENSING LEVER AND A ROTATABLE FLOW VALVE

[75] Inventors: Council A. Tucker, Los Angeles; Oliver B. Gains, Arcadia, both of Calif.

[73] Assignee: Towlsaver, Inc., City of Industry, Calif.

[21] Appl. No.: 883,489

[22] Filed: Mar. 6, 1978

[51] Int. Cl.³ .............................................. B67D 5/06
[52] U.S. Cl. ................................... 222/181; 222/309; 222/325; 222/377; 222/448
[58] Field of Search ................. 222/43, 181, 183, 185, 222/282, 287, 309, 317, 325, 340, 341, 377, 378, 380, 383, 496, 547, 564, 448, 449, 477; 239/DIG. 22, 28, 29

[56] References Cited

U.S. PATENT DOCUMENTS

| 647,773 | 4/1900 | Travis | 222/185 |
|---|---|---|---|
| 1,886,237 | 7/1932 | Thompson et al. | 222/341 |
| 1,886,288 | 11/1932 | McDow | 222/181 |
| 2,585,299 | 2/1952 | Cook | 222/449 X |
| 2,873,050 | 2/1959 | Halverson | 222/449 X |
| 2,898,009 | 8/1959 | Green | 222/308 |
| 3,097,763 | 7/1963 | Alvotto | 222/309 X |
| 4,036,406 | 7/1977 | Jepersen et al. | 222/181 |
| 4,036,438 | 7/1977 | Soderlind et al. | 239/DIG. 22 X |

Primary Examiner—Robert J. Spar
Assistant Examiner—Fred A. Silverberg
Attorney, Agent, or Firm—Mahoney & Schick

[57] ABSTRACT

A cabinet forms a frame mounting a dispensing mechanism, a soap reservoir comprised of a sump and container, and an actuating lever, all of which are selectively removable from the frame for maintenance purposes. The dispensing mechanism and reservoir sump are formed unitary slideably connected to the frame with the actuating lever pivotally connected partially overlying the dispensing mechanism in cantilever extension vertically pivotal by a forward broadened hand engaging portion to actuate the dispensing mechanism therebeneath. The reservoir container is supported inverted on the reservoir sump emptying downwardly therein and partially forwardly overlies the actuating lever, being forwardly supported to prevent the container from inadvertently depressing the actuating lever dispensing soap from the dispensing mechanism when the container is removed forwardly and replaced rearwardly to replenish the soap supply. Stroke adjustment for the actuating lever may be provided to adjust the soap volume dispensed on each lever stroke and soap flow adjustment to the dispensing mechanism may be provided increasing or decreasing time required between lever dispensing strokes. Also, the soap discharge end of the dispensing mechanism nozzle may be provided with projection means preventing nozzle closing off by an operator's finger.

9 Claims, 17 Drawing Figures

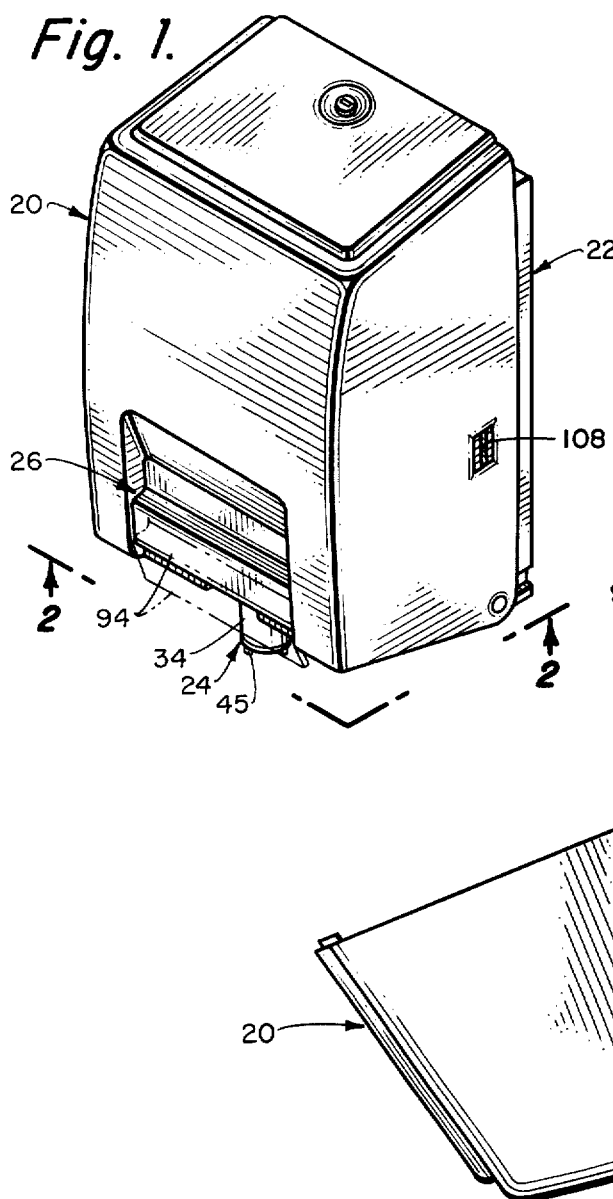
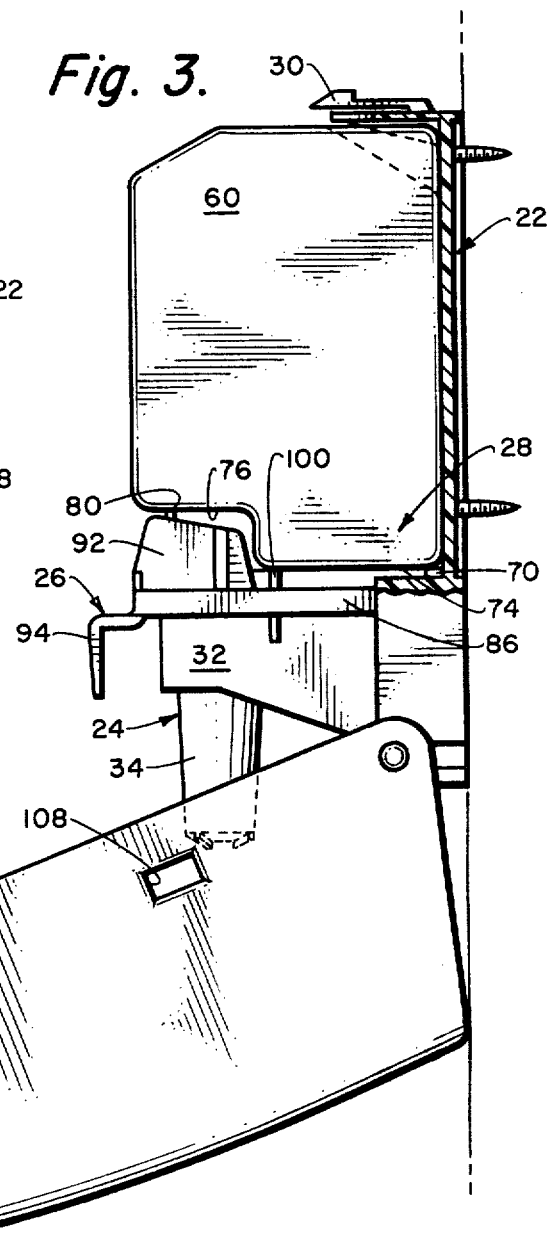
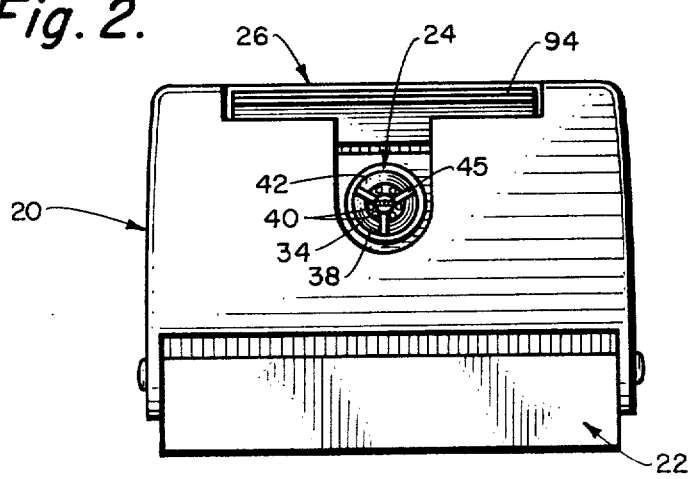

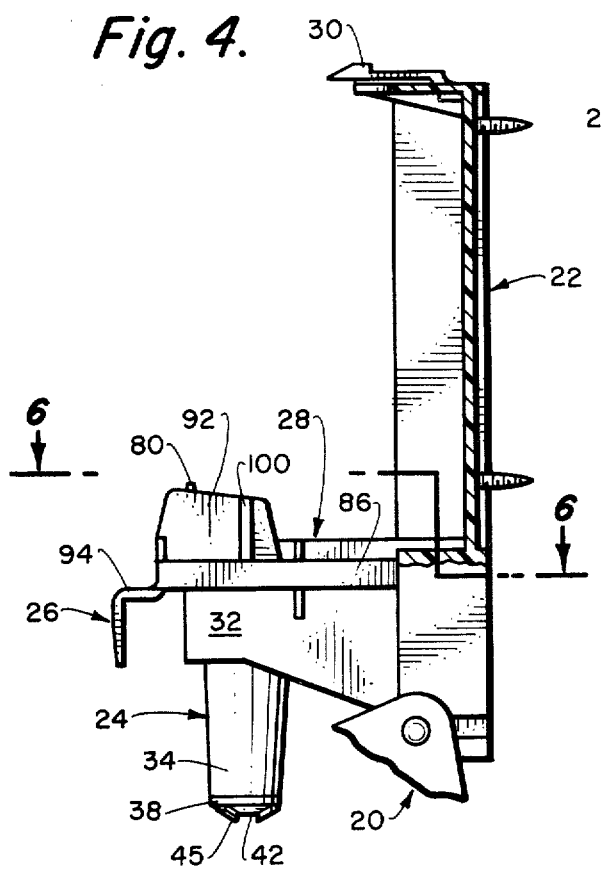
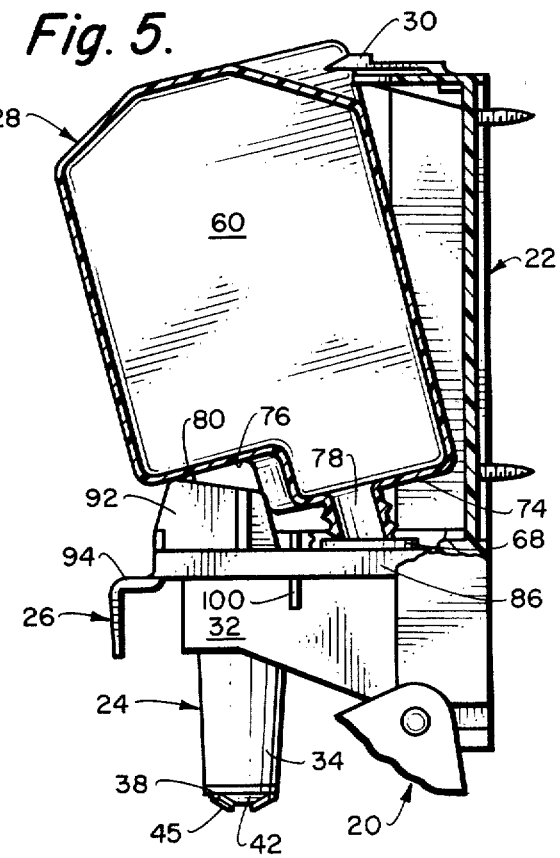
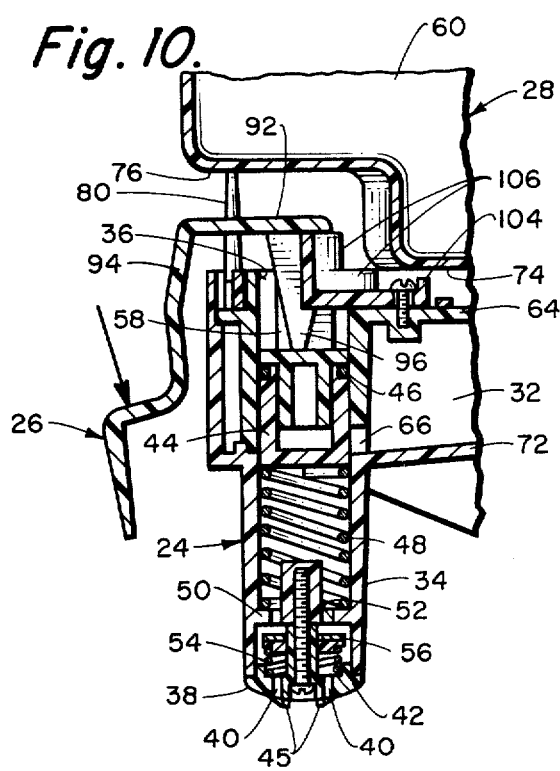
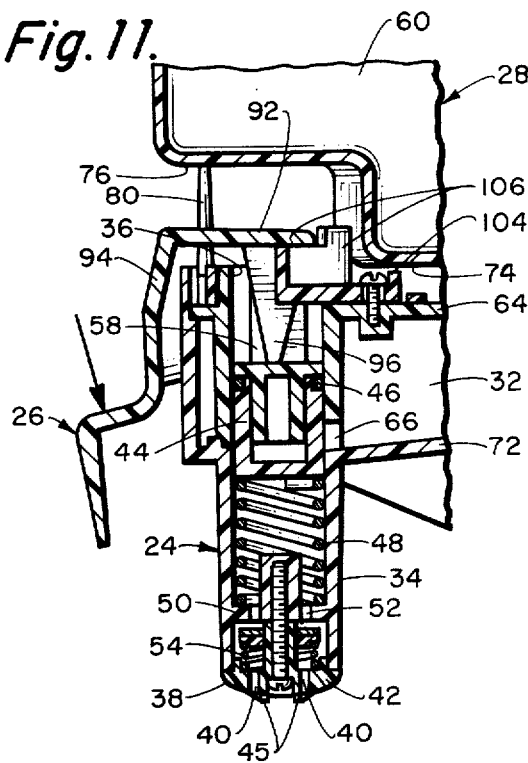

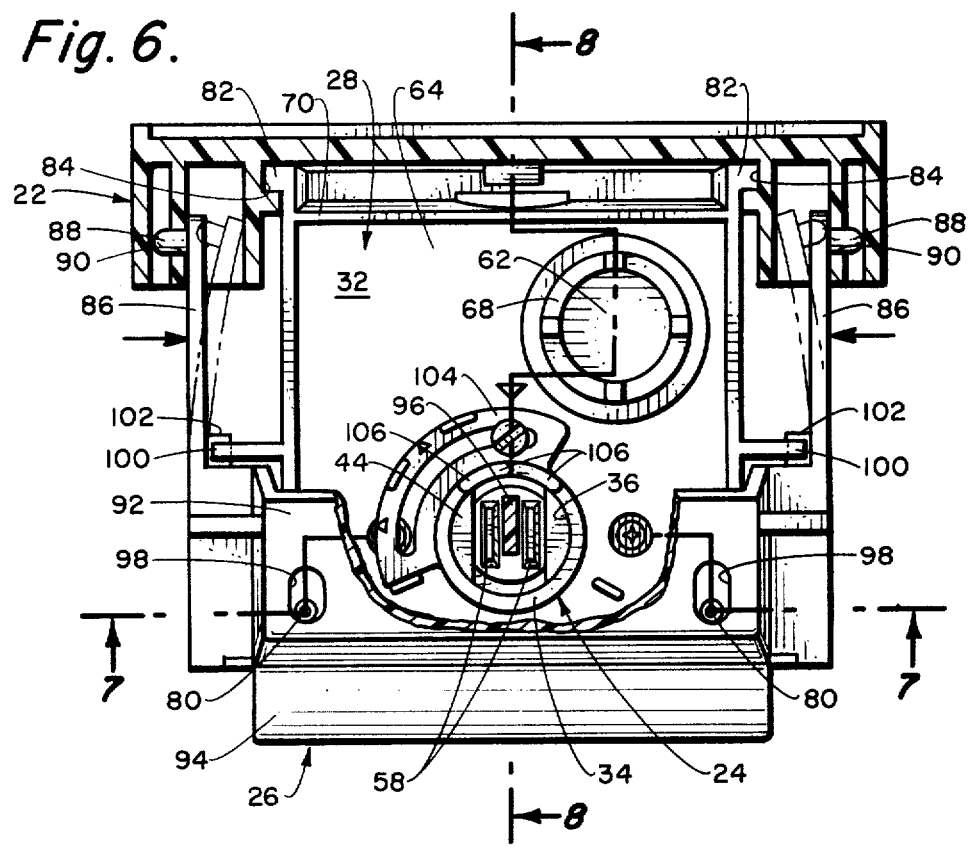
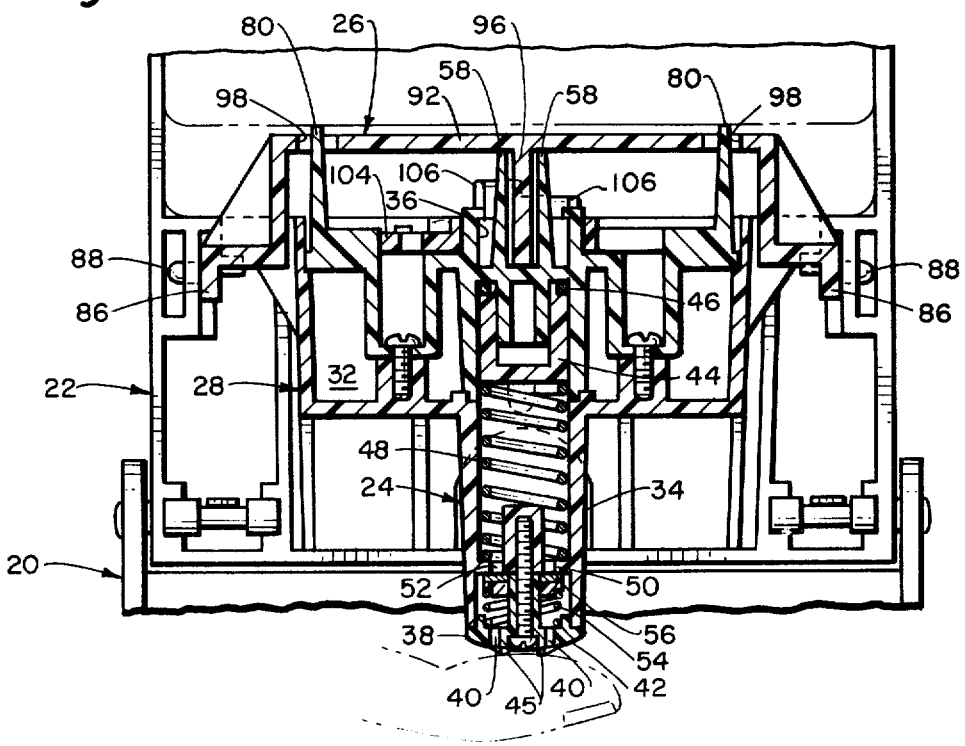

SOAP DISPENSER HAVING A PIVOTABLE DISPENSING LEVER AND A ROTATABLE FLOW VALVE

BACKGROUND OF THE INVENTION

This invention relates generally to soap dispensers for dispensing flowable soap and the like. More particularly, this invention relates to improvements in various components of such soap dispensers which, when individually used, or used in concert, provide soap dispensers which are more advantageously operable and more perfectly controllably operable over any of the prior flowable soap dispensers. According to the present invention, the improvements to the soap dispenser components may include an improved actuating or dispensing lever positioning and control, certain adjustable means for selectively varying the quantity of soap dispensed on each dispenser actuation, certain other adjustable means for selectively varying the operational speed of the dispenser and thereby the time required for each dispenser complete dispensing operation, an improved dispensing nozzle formed to prevent inadvertent stoppage or misdirection of the soap being dispensed thereby as could otherwise be caused by a person using the dispenser, an improved support for a main soap supply container so that the same may be selectively removed and replaced to replenish the soap supply without danger of inadvertent soap dispensing during such replacement operation, and a unique overall assembly of the dispenser major components permitting ready and convenient disassembly for usual required maintenance operations.

Various prior soap dispensers for dispensing flowable soap and the like have heretofor been provided, but despite the relatively extensive prior development thereof, many deficiencies are still apparent. Flowable soap dispensers encompass broadly two basic types, one type for dispensing granular soap and another type for dispensing liquid soap, although many of the components thereof can be quite similar and improvements to such components can frequently be applied to both. Referring specifically to these prior flowable liquid soap dispensers, a quite common form thereof has included a dispensing cylinder enclosing a reciprocal piston, the piston being at rest at one cylinder end during cylinder automatic soap filling following a dispensing stroke, the piston being reciprocated to force the charge of soap to be dispensed at or near the opposite piston end and the piston returning to "at rest" position for the next piston automatic soap refilling. Furthermore, many of these prior soap dispensers have included soap supply containers which, rather than being permanently affixed and requiring soap supply replenishment directly into the dispenser itself, are supported conveniently removable and replaceable with a new soap-filled container.

One of the major deficiencies with the prior forms of cylinder-type of soap dispensers has been the manner of actuation of the soap dispensing cylinders during the dispensing operation. Obviously, some form of actuating or dispensing lever must be provided operably connected for moving the piston within the dispensing cylinder in its determined soap dispensing strokes. In most of the prior cylinder-type of soap dispensers, these cylinder actuating levers have been inefficiently positioned not the most conveniently accessible to the dispenser operator, have relatively small operating surfaces required to be contacted by the dispenser operator and are connected to the piston of the cylinder for transmitting the actuating force therebetween on a maximum force requirement one to one basis. The combination of these factors has frequently resulted in the actuating levers being relatively difficult and inconvenient of operation.

Another deficiency in the prior soap dispensers has been either the complete lack of adjustability or a quite difficult manner of adjustability for regulating the quantity of soap dispensed on each actuating lever dispensing stroke. With the cylinder-type of liquid soap dispensers, once the cylinder has been automatically filled with soap, the amount of soap dispensed on a piston dispensing stroke is automatically determined by the length of such stroke and as long as the person operating the dispenser moves the actuating lever its maximum intended movement, the same quantity of soap will be dispensed on each actuation. Thus, if the quantity of soap to be dispensed on each lever actuation is to be increased or decreased, some means must be provided for regulating the piston stroke within the cylinder. As previously stated, many of the prior soap dispensers have not included any such adjustability once the dispenser has been originally fabricated, while others, although including such adjustability, have done so in a manner which is exceedingly difficult and in many cases requires complete disassembly of the dispenser.

Still another deficiency with many of the prior soap dispensers has been that they are subject to "milking", that is, by an operator performing quickly repeated actuating strokes, it is possible to dispense quite large quantities of soap on an overall dispenser actuation, thereby not only needlessly wasting soap, but quickly depleting the soap supply. This danger of "milking" is particularly prevalent in liquid soap dispensers of the cylinder-type discussed and the possibilities thereof are determined by the time required for automatically refilling the cylinder after each actuating stroke combined with the viscosity of the particular liquid soap. It is seen, therefore, that for the control and prevention of such "milking", selective regulation of the automatic cylinder refilling is required in order to adapt the dispenser actuating stroke speeds and the time otherwise required for soap refilling flow in order to positively require sufficient hesitation between actuating strokes which will frustrate attempted "milking". Similar to the soap quantity regulation discussed in the foregoing, this soap flow regulation has frequently been completely lacking from the prior dispensers or at least without a major complex disassembly.

A still further factor of consideration with soap dispensers is the disassembly and reassembly of the main soap supply container where the same is arranged for ready replacement to replenish the main soap supply and the disassembly of all of the other major dispenser components required at relatively frequent intervals merely for maintenance purposes. As to the main soap supply container, due to the particular dispenser component positioning and, in many cases, a complex required manipulation of the container for such removal and replacement, there has been a danger of inadvertently actuating the dispenser and dispensing soap therefrom during this container removal and replacement in the prior constructions. Furthermore, as to the disassembly and reassembly of the major dispenser components, usually including the main soap supply container, in order that necessary maintenance operations may be performed, most of the prior dispensers have been lacking in that the various components have been positioned inaccessible and quite difficult of removal, thereby completely avoiding any consideration of the vitally necessary maintenance operations.

OBJECTS AND SUMMARY OF THE INVENTION

It is, therefore, one of the important objects of the present invention to provide a soap dispenser for dispensing flowable soap and the like wherein the actuating or dispensing lever thereof required to be manipulated by an operator in order to dispense soap therefrom is of a unique character, not only of a relatively large and accessible form for a maxium of convenience in manipulation thereof, but also is operably connected to the dispensing device of the dispenser through a mechanical advantage arrangement requiring markedly less actuating force thereagainst by the operator during such dispensing manipulations. According to a preferred embodiment of the present invention, the actuating or dispensing lever is pivotally connected to the dispenser frame projecting generally horizontally forwardly partially overlying the dispensing mechanism and freely accessible forwardly of the dispensing mechanism. An extreme forward lever hand engaging portion is transversely broadened providing a large hand engaging surface capable of easy and convenient engagement and manipulation. Also, the portion of the lever overlying the dispensing mechanism is spaced rearwardly of the hand engaging portion and is downwardly operably connected to and for dispensing operation of the dispensing mechanism resulting in a mechanical advantage and requiring a lesser operator manipulation force against the lever hand engaging portion to provide a greater operating force into the dispensing mechanism for such dispensing operation.

It is a further object of this invention to provide a soap dispenser for dispensing flowable soap and the like wherein unique adjustment means of various forms may be included, one adjustment means for selectively varying the quantity of soap dispensed during each dispenser actuation and another adjustment means for selectively varying the operational speed of the dispenser to regulate the overall time required for each dispenser operation, both of which, if provided, are located and constructed conveniently accessible with minimum dispenser disassembly and easily adjustable. Again, according to preferred embodiments of the present invention, the adjustment means for selectively varying the quantity of soap dispensed on each dispenser actuation may be merely a selectively adjustable abutment means associated with the pivotal actuating lever so that, by selectively adjustably varying the length of the actuating lever pivotal stroke, the consequent movement of the dispensing mechanism is likewise adjustably varied so as to increase or decrease the overall volume of soap dispensed by each dispenser actuation. The adjustment means for selectively varying dispenser operational speed may take on the form of a selectively adjustable flow valve adjustable to decrease or increase the flow rate of the soap between the soap supply and the dispensing mechanism and thereby varying the time required during each dispenser operation to provide a new full volume of soap for the next dispenser operation. The result is that through this selective soap flow timing adjustment, the so-called "milking" of the dispenser can be effectively controlled.

It is still a further object of this invention to provide a soap dispenser for dispensing flowable soap and the like which may be formed for eliminating the possibility of certain inadvertent misuse of the dispenser which could cause a misdirected or unintended soap dispensing therefrom. Again, according to the preferred embodiment thereof, the soap dispenser of the present invention may be provided with a dispensing nozzle which dispenses the soap through an opening or openings at a nozzle end surface and specific projection means is formed on such nozzle end surface preventing an abutment thereagainst, such as an operator's finger, from closing off the nozzle opening or openings which, if such closing off were permitted, would either misdirect the soap being dispensed or even possibly prevent any soap dispensing. Also, in the preferred embodiment form, the dispenser main soap supply container is removable and replaceable for replenishing the main soap supply, and when the container is assembled in the dispenser, it partially overlies the previously described generally horizontally extending, pivotal actuating lever which is vertically pivotal for actuating the dispensing mechanism. To prevent an inadvertent depression of the actuating lever by the container during the removal or replacement thereof which could cause inadvertent soap dispensing when not intended nor desired, special support means for the container is provided overlying the movement path of the actuating lever, thereby effectively preventing contact between the container and the lever so as to completely avoid inadvertent soap dispensing.

It is still an additional object of this invention to provide a soap dispenser for dispensing flowable soap and the like wherein the overall dispenser is uniquely assembled in a manner adapting the same for convenient disassembly and reassembly in order that the various components thereof may be individually serviced through proper maintenance procedures to maintain the dispenser at all times in properly operable condition. According to the preferred embodiment of the present invention, the main soap supply container is readily removable and replaceable without disturbing the other basic components, the pivotal actuating lever partially overlying the dispensing mechanism beneath a portion of the container has its pivotal connections easily selectively separable, and the dispensing mechanism, usually including an integrally connected soap reservoir sump, is slideably connected in assembly. Thus, when it is desired to disassemble the dispenser for the required maintenance operation, it is only necessary to first normally remove the container, then quickly disconnect and remove the actuating lever, and then slideably remove the dispensing mechanism with its integral sump, the reassembly thereof merely being the reverse procedure. In this manner, the necessary maintenance operations may be performed with maximum convenience and in a minimum amount of time.

Other objects and advantages of the invention will be apparent from the following specification and the accompanying drawings which are for the purpose of illustration only.

BRIEF DESCRIPTION OF THE DRAWINGS

FIG. 1 is a perspective view of a liquid soap dispenser incorporating a preferred embodiment of the principles of the present invention;

FIG. 2 is a bottom plan view of the soap dispenser of FIG. 1 looking in the direction of the arrows 2—2 in FIG. 1;

FIG. 3 is a side elevational view, part in vertical section, showing the dispenser of FIG. 1 wall mounted in operable soap dispensing position and with the cabinet thereof in open condition exposing the interior components thereof;

FIG. 4 is a fragmentary, side elevational view, part in vertical section, similar to FIG. 3, but with a main soap supply container removed;

FIG. 5 is a view similar to FIG. 4, but with the main soap container partially inserted midway of either insertion or removal thereof from the dispenser;

FIG. 6 is an enlarged, horizontal sectional view, with certain parts broken away, looking in the direction of the arrows 6—6 in FIG. 4;

FIG. 7 is a fragmentary, vertical sectional view looking in the direction of the arrows 7—7 of FIG. 6;

FIG. 10 is a view similar to FIG. 9, but showing adjustment means for the actuating lever limiting the actuating lever to a minimum length of dispensing stroke;

FIG. 11 is a view similar to FIGS. 9 and 10, but showing the adjustment means for the actuating lever limiting the lever to an intermediate length dispensing stroke;

DESCRIPTION OF THE BEST EMBODIMENTS CONTEMPLATED

Figure 12:
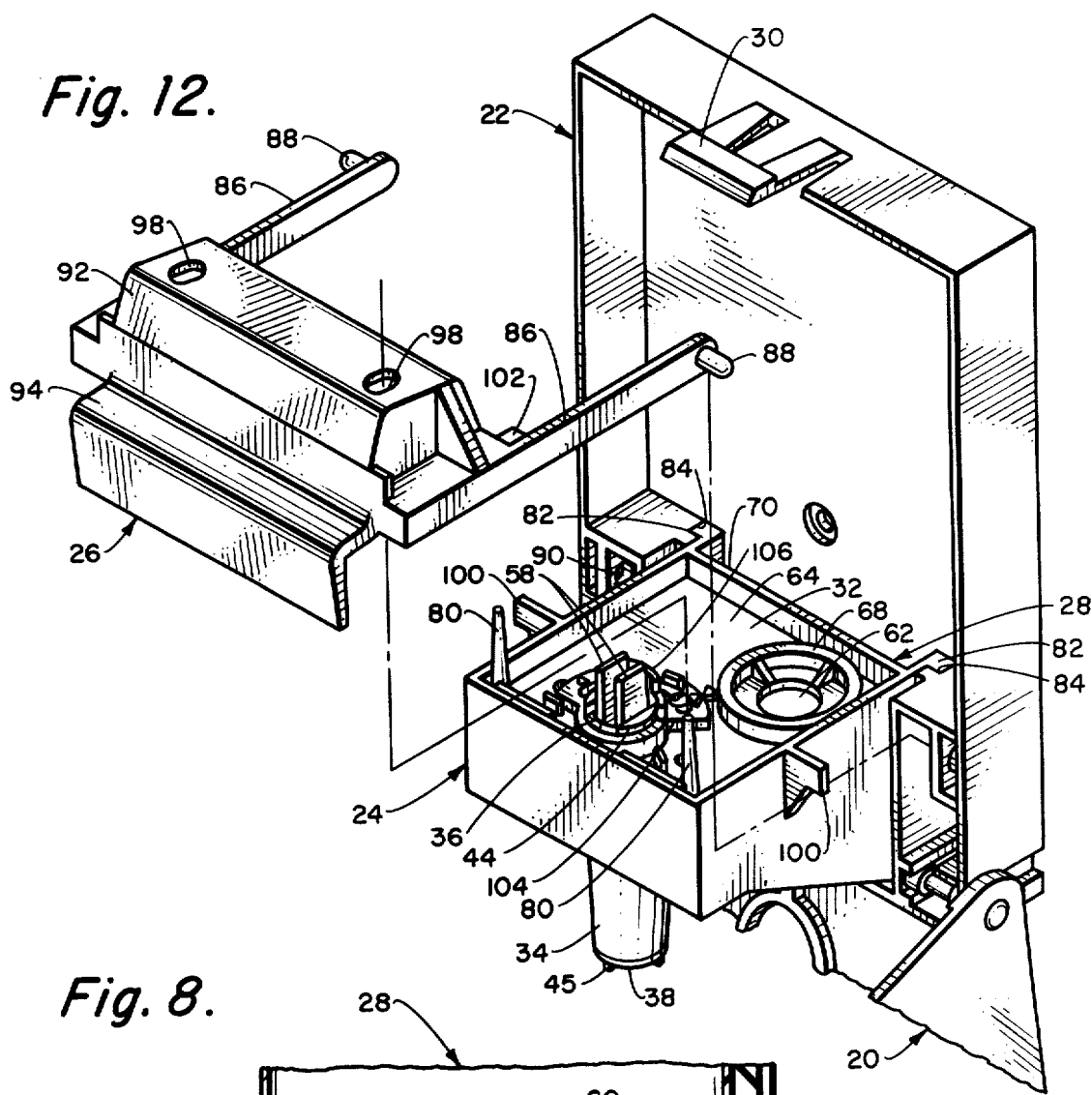
FIG. 12 is an exploded, fragmentary perspective view of the dispenser showing the main soap supply container completely removed, the actuating lever disengaged for removal and the dispensing mechanism still assembled to illustrate selective disassembly of the dispenser.

Embodiments of a soap dispenser incorporating the principles of the present invention are illustrated and will be described in detail herein. It is initially pointed out, however, that the term "flowable soap" is generic to both liquid and granular soap, although the soap dispenser illustrated and to be described is primarily adapted for dispensing liquid soap. Despite this, it will be apparent to those skilled in the art that the improvements of the present invention are applicable with minor or no alteration to substantially any form of flowable soap dispenser so that it is not intended to limit the improvements of the present invention to the exact soap dispenser embodiments shown.

Referring to FIGS. 1 through 13 of the drawings, a wall-mounted liquid soap dispenser is shown and includes a rearwardly opening, generally rectangular cabinet generally indicated at 20 forwardly and downwardly pivotal on a wall-mounted frame generally indicated at 22 and normally enclosing the soap dispensing mechanism generally indicated at 24, the dispensing or actuating lever generally indicated at 26, and a soap supply reservoir generally indicated at 28. As shown in FIG. 1, the cabinet 20 is in closed position retained by a usual latch 30 and adapting the dispenser for normal soap dispensing in a manner to be hereinafter described in detail. In FIG. 3, the latch 30 has been selectively released and the cabinet 20 is in forwardly and downwardly pivoted open position exposing the internal components of the dispenser. Generally, the overall dispenser may be formed of usual materials and by usual manufacturing procedures, all well-known to those skilled in the art.

The dispensing mechanism 24 is supported on the frame 22 through integral connection thereof to a reservoir sump 32 forming a part of the soap supply reservoir 28, all in a manner to be hereinafter described in detail. Furthermore, the dispensing mechanism 24 is comprised of a vertically extending cylinder or nozzle 34 having a completely open upper end 36 and a partially closed lower dispensing end 38, the dispensing end being closed except for a ring of spaced dispensing openings 40 therethrough terminating downwardly at a lower end surface 42. Preferably three radially extending and downwardly projecting ribs 45 are formed on the lower end surface 42 displaced from or intermediate the dispensing openings 40 and thereby projecting below the termination of the dispensing openings for a purpose to be hereinafter described. As shown, the cylinder or nozzle lower dispensing end 38 may be formed as a selectively removable cap, screw retained in normal dispensing position.

A piston 44 slideably sealed by a usual sealing ring 46 is vertically reciprocally positioned in the cylinder 34 overlying and controlled by a compression control spring 48. The lower end of the control spring 48 downwardly abuts a cylinder radial partition 50 spaced upwardly from the cylinder lower end 38 and having a multiplicity of soap flow openings 52 therethrough. Beneath the cylinder partition 50, a compression closure spring 54 downwardly abuts the cylinder lower end 38 and upwardly abuts and controls a vertically reciprocal closure seal 56 directly underlying and normally sealing off the flow openings 52 of the cylinder partition 50. Still further, a pair of spaced protrusions 58 project upwardly from the piston 44, again for a purpose to be hereinafter described.

The soap supply reservoir 28 is comprised of a removable and insertable reservoir container 60 and the previously alluded to reservoir sump 32. The reservoir sump 32 is closed except for a main soap supply opening 62 intermediate a generally horizontal upper wall 64 and particularly sized and located flow opening 66 through the adjacent wall of and into the dispensing mechanism cylinder 34. An annular, ribbed lip 68 is formed outwardly around the main soap supply opening 62 and a generally vertical extension support 70 is formed on the sump 32 spaced slightly rearwardly of the main soap supply opening, both of which may be seen, for instance, in FIGS. 6, 8 and 12. The sump flow opening 66 communicates between the interiors of the sump 32 and dispensing mechanism cylinder 34 at the lowest level of the sump and beneath the dispensing mechanism piston 44 when such piston is in its uppermost "at rest" position as will later be explained more in detail and it will be noted that lower wall 72 of the sump slopes slightly downwardly in its progression forwardly to the flow opening as can be seen, for instance, in FIG. 8.

Figure 8:
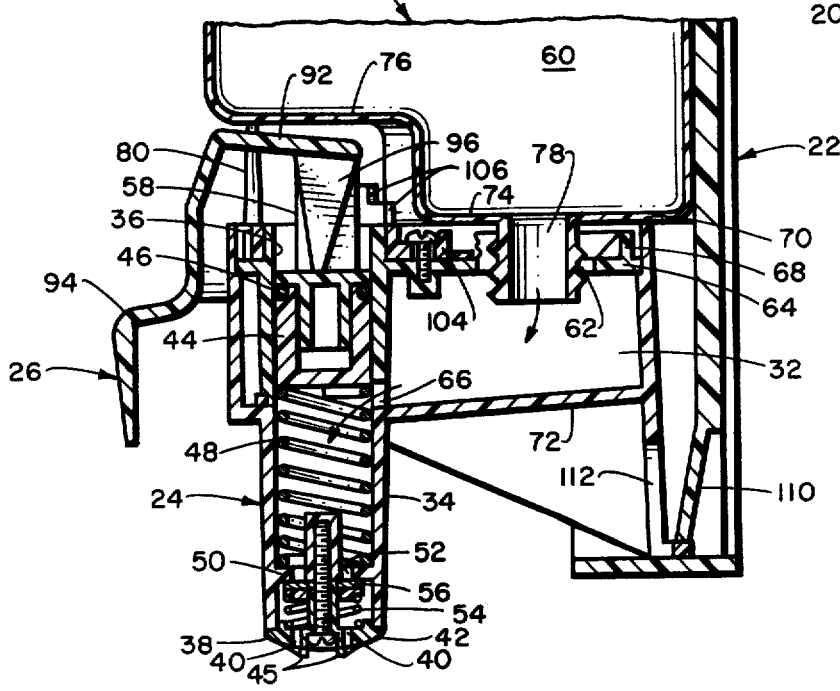
FIG. 8 is a fragmentary, vertical sectional view looking in the direction of the arrows 8—8 in FIG. 6, showing an actuating or dispensing lever and a dispensing mechanism of the dispenser "at rest" ready for a dispensing operation.

The reservoir container 60 is, in effect, a preferably plastic bottle of particular configuration to be positioned within the dispenser cabinet 20 in inverted position and when in such operable inverted position has a stepped, now bottom wall comprised of a rearward projecting portion 74 and a forward recessed portion 76. The rearward projecting portion 74 is formed with a usual threaded nozzle 78 for closure by a usual cap (not shown) when the container is upright, but now positioned projecting downwardly through the main soap supply opening 62 into the sump 32 as shown, for instance, in FIG. 8. Furthermore, as shown, in such operable positioning, the container 60 rearwardly abuts the dispenser frame 22 and also transversely slideably abuts such dispenser frame while the container rearward projecting portion 74 rests downwardly on the previously alluded to sump rearward extension support 70. This positions the rearward projecting portion 74 of the container, now lower wall, spaced above the sump main soap supply opening 62 and its lip 68, so that with the container nozzle 78 being of lesser circumferential dimensions then the sump main soap supply opening as shown in FIG. 8, an annular air passage is formed upwardly from the sump 32 beneath the container 60 and into the surrounding atmosphere, all for a purpose to be hereinafter described.

In this dispenser positioning, the forward recessed portion 76 of the container, now bottom wall, projects forwardly spaced above and overlying the dispensing mechanism 24 with the container 60 being forwardly supported at the upper extremities of a pair of transversely spaced and vertically extending support posts 80. The support posts 80 are stationary in the dispenser assembly downwardly secured to the dispensing mechanism 24 projecting upwardly to engage the container forward recessed portion 76. Thus, the support posts 80 not only forwardly support the container 60, but also serve to guard and always maintain the vertical spacing between the container forward recessed portion 76 and the spaced downward dispensing mechanism 24 for purposes to be later more clearly explained. Equally importantly from the overall viewpoint, however, these support posts 80 combine with the previously described elements to support the container 60 forwardly removeable and rearwardly insertable in a manner to be later discussed, not only for purposes of soap supply replenishment, but also for disassembling the internal components of the dispenser to perform timely maintenance operation, this latter maintenance disassembly being augmented by the securement of the unitary dispensing mechanism 24 and reservoir sump 32 on the dispenser frame 22 through downward slideable reception into assembled position and upward slideable removal therefrom permitted by sump vertical guides 82 received slideably vertically downwardly in frame slots 84 as shown particularly in FIGS. 12 and 13, and to be likewise further discussed.

The dispensing or actuating lever 26, as can be best seen in FIGS. 6, 7, 12 and 13, is comprised of a pair of transversely spaced, forwardly extending legs 86 rearwardly pivotally connected to the dispenser frame 22 through pivot pins 88 of the legs transversely received in pin openings 90 of the frame. The lever legs 86 project generally horizontally forwardly in generally cantilever extension to a vertically raised, transversely broadened, intermediate joining portion 92 which blends downwardly into a transversely broadened, generally inverted L-shaped, forward hand engaging portion 94. As can be most clearly seen in FIGS. 6, 7 and 8, although the lever 26 is easily detachable from the dispenser frame 22 merely by transverse flexing of the legs 86 to remove the pivot pins 88 from the frame (FIG. 6), when in dispenser assembly as shown, the legs horizontally straddle the reservoir sump 32 and the lever intermediate portion 92 overlies the dispensing mechanism 24 and underlies the forward recessed portion 76 of the reservoir container 60, the lever hand engaging portion 94 extending forwardly in front of the dispensing mechanism and forwardly of the container.

Transversely centrally, the lever intermediate portion 92 is formed with a vertically downwardly projecting actuating member 96 which is separably received downwardly between the previously described protrusions 58 on the piston 44 of the dispensing mechanism 24, the lower surface of the actuating member abutting the upper main surface of the dispensing mechanism piston as shown. Furthermore, spaced clearance openings 90 are formed vertically through the lever intermediate portion 92 permitting free extension therethrough of the stationary container engaging support posts 80 while permitting pivotal movement of the lever 26. Still further, as are particularly well shown in FIG. 6, stops 100 project oppositely transversely outwardly from the unitary dispensing mechanism 24 and reservoir sump 32 overlying appropriate flanges 102 on the respective lever legs 86 to limit upward pivotal movement of the lever 26 to an upper position spaced slightly below the container 60 as shown in FIG. 8.

Thus, in normal dispenser assembly, the actuating lever 26 projects forwardly in generally horizontal cantilever extension and in the fashion of a bail, being generally vertically pivotal and having a broadened forward hand-engaging portion 94 which is easily and conveniently grasped by a user's hand for selectively pivoting the lever. The upper limit of pivotal movement of the lever 26 or its "at rest" position is shown in FIG. 8 and is determined by the stops 100, the lever flanges 102 being forced upwardly thereagainst when the dispensing mechanism piston 44 is urged to its uppermost "at rest" position of FIG. 8 by the control spring 48 and nearly clear of the cylinder flow opening 66. The lever 26 may be selectively pivoted downwardly by applying a downward force to the lever forward hand engaging portion 94 which will force the dispensing mechanism piston 44 downwardly within the cylinder 34 while compressing the control spring 48, the piston being returned upwardly within the cylinder and the lever therewith by the control spring upon a release of the lever forward hand engaging portion.

Figure 9:
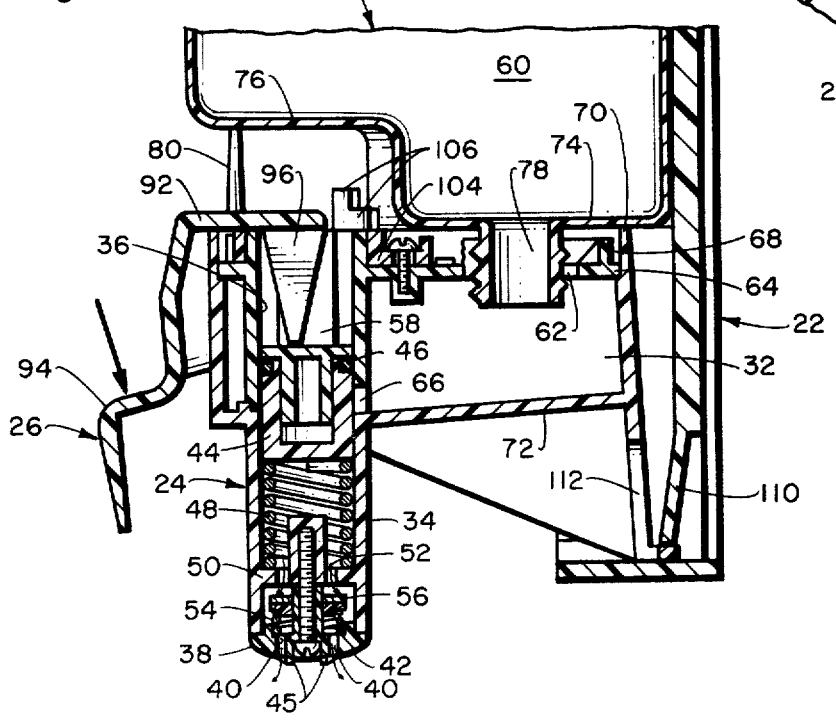
FIG. 9 is a view similar to FIG. 8, but with the actuating lever and dispensing mechanism just completing a dispensing operation of maximum actuating lever stroke and ready for the lever to return toward "at rest" position.

The length of the downward portion of the stroke of the lever 26 and, therefore, the downward movement of the dispensing mechanism piston 44 within its cylinder 34, without more, would be determined by the lever intermediate portion 92 engaging downwardly against a forward portion of the dispensing mechanism 24 as shown in FIG. 9, this being a maximum length of actuating or dispensing stroke. However, it is preferred to mount a horizontally pivotal lever abutment member on the dispensing mechanism 24 having a vertically upwardly exposed, stepped abutment surface 106. Thus, by selectively pivoting the lever abutment member 104 when the lever 26 is in its upper "at rest" position of FIG. 8, the length of the downward portion of the lever stroke and, therefore, the length of the downward movement of the dispensing mechanism piston 44 in its cylinder 34 can be limited. By bringing portions of the stepped abutment surface 106 of the lever abutment member 104 beneath or underlying and to be abuttingly engaged by the lever intermediate portion 92, a maximum limitation of stroke can be obtained as shown in FIG. 10 or an intermediate limitation of stroke can be obtained as shown in FIG. 11 with the consequences thereof to be later discussed.

Finally, as to the overall assembly of the dispenser, when the cabinet 20 is in its closed position latched with the frame 22 as shown in FIGS. 1 and 2, appropriate permanent openings are formed forwardly and downwardly therethrough to accommodate the foward extension of the actuating lever 26 making its forward hand engaging portion 94 freely accessible to an operator using the dispenser and to accommodate the downward extension of the dispensing mechanism cylinder or nozzle 34 with its lower dispensing end 38 spaced beneath the cabinet 20 to be accessible to the operator for receiving the soap being dispensed. These cabinet openings must, of course, be sufficient to permit the cabinet 20 to clear these components when the cabinet is pivoted downwardly to open position shown in FIG. 3. In addition, one or both of the sides of the cabinet 20 may be provided with sight openings 108 therethrough at appropriate locations for sighting the level of soap within the reservoir container 60 when it is approaching depletion and while the cabinet remains closed.

In operation of the embodiment of the dispenser just described, with the reservoir container 60 assembled in place as shown and having an adequate supply of liquid soap therein, the soap will flow downwardly to fill the reservoir sump 32 and with the actuating lever 26 in its upper "at rest" position, the soap will automatically flow through the cylinder flow opening 66 filling the cylinder 34 between the piston 44 and the lower cylinder partitions 50, being prevented from flowing further downwardly by the spring urged closure seal 56. Assuming an adjustment setting of the lever abutment member 104 for maximum stroke as shown in FIG. 9, a maximum downward movement of the actuating lever 26 will, through the actuating member 96, force the piston 44 downwardly in the dispensing mechanism cylinder 44 immediately closing off the flow opening 66 while compressing the control spring 48 and, due to its lack of compressability, force a major portion of the soap within the cylinder downwardly through the flow opening 52 of the cylinder partition 50 forcing the closure seal 56 to downwardly compress the closure spring 54 and permit the soap to flow therearound downwardly through and from the dispensing openings 40 in the cylinder lower dispensing end 38. Upon the actuating lever 26 being released, the piston control spring 48 will begin to force the piston 44 upwardly within the cylinder 34 relieving pressure and permitting the cylinder closure spring 54 to force the closure seal 56 upwardly against the cylinder partition 50 closing the flow openings 52 and preventing any further dispensing of soap from the cylinder 34. Ultimately, the piston 44 will be forced fully upwardly within the dispensing mechanism cylinder 34 to its uppermost "at rest" position of FIG. 8 once again exposing the cylinder flow opening 66 at the reservoir sump 32 which will permit a new soap supply to flow inwardly from the reservoir sump and air within the cylinder to bubble upwardly through the soap into the sump and ultimately outwardly through the sump main soap supply opening 62 around the container nozzle 78.

The dispensing mechanism cylinder 34, therefore, again is filled with a charge of soap to be dispensed and a subsequent actuation of the actuating lever 26 will perform the same dispensing operation. Furthermore, if it is desired to reduce the amount of soap dispensed during each of the strokes of the actuating lever 26, the cabinet 20 is opened and the reservoir container 60 is removed in a manner to be hereinafter explained, which exposes the lever abutment member 104 for selective adjustment thereof to either the least stroke and least soap dispensing of FIG. 10 or the intermediate stroke and intermediate soap dispensing of FIG. 11. Obviously, the length of the downward stroke of the actuating lever 26 which determines the length of the downward stroke of the dispensing mechanism piston 44 will determine the amount of soap dispensed on each dispenser operation so that the adjustment of the stroke will decrease or increase the amount of soap dispensed.

After a repeated number of the soap dispensing operations of the dispenser as just described, the main soap supply in the reservoir container 60 will ultimately become depleted, the pre-warning for such depletion being visually indicated through the sight openings 108 of the cabinet 20 shown in FIG. 1. At the time of actual depletion, the level of the soap supply will be within the reservoir sump 32 (FIG. 8) and nearly or totally below the threaded container nozzle 78. The container 60, therefore, is ready for removal and replacement.

Removal of the reservoir container 60 is accomplished merely by releasing the latch 30 on the cabinet 20 and pivoting the cabinet downwardly from the position shown in FIG. 1 to the position shown in FIG. 3, thereby completely exposing the container as well as the other components of the dispenser. The container 60 is then pivoted forwardly away from the frame 22 and forwardly over the upper extremities of the support posts 80 from the installed position shown in FIGS. 3 and 8 through the position shown in FIG. 5 and then angularly vertically upwardly for complete removal from the cabinet 20 and frame 22. It will be noted that this pivoting over the support post 80 prevents the container 60 from downwardly depressing the actuating lever 26 which, if permitted, could cause dispensing of soap from the cylinder 34 of the dispensing mechanism 24. Installation of a new reservoir container 60 is accomplished by the exact reverse procedure, partially reinserting to the position of FIG. 5 and then reversely pivoting into the fully installed position of FIGS. 3 and 8 with the support posts 80 preventing inadvertent soap dispensing from the dispenser in the same manner and the cabinet 20 eventually being closed from the position of FIG. 3 into the dispensing position of FIG. 1.

After the dispenser has been used for dispensing soap therefrom over an appropriate period of time, periodic maintenance of the same will be required primarily merely for cleaning and to be sure that the internal components are properly functional, although the replacement of worn seals and springs may also ultimately be required. Disassembly for maintenance is initiated in the same manner as described in the foregoing for the replacement of a depleted reservoir container 60 with a full container, that is, opening the cabinet 20 from the position of FIG. 1 to the position of FIG. 3 and the removal of the container from the position of FIGS. 3 and 8 through the position of FIG. 5 and ultimately free of the cabinet 20 and frame 22. This places the dispenser in the condition shown in FIG. 4 with the dispensing mechanism 24 and actuating lever 26 fully exposed.

Figure 13:
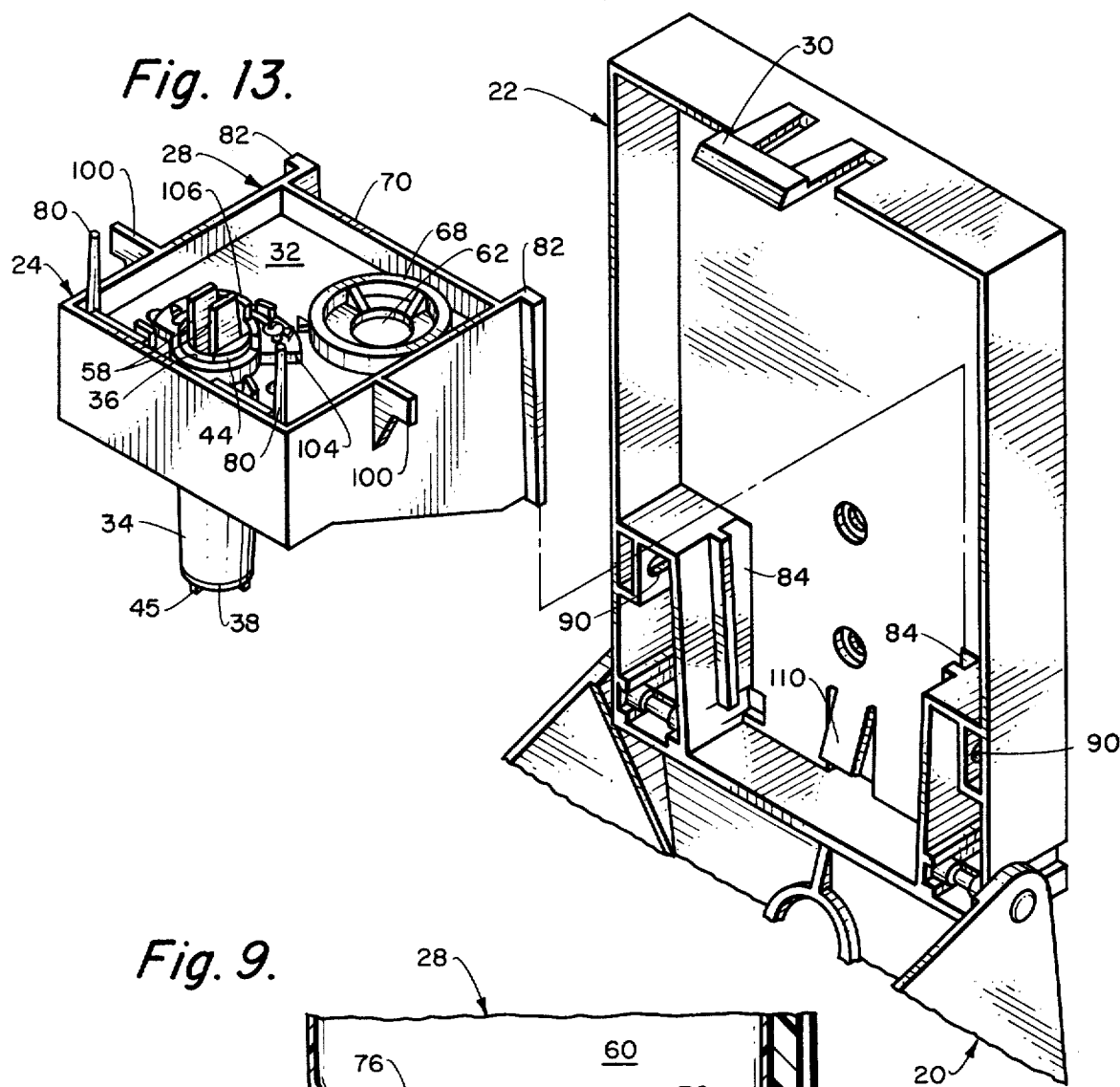
FIG. 13 is a view similar to FIG. 12, but further progression of the selective disassembly of the dispenser wherein the dispensing mechanism has now been disengaged for removal.

The actuating lever 26 is first removed and this is done by initially flexing the legs 86 transversely inwardly as shown in phantom lines in FIG. 6 disengaging the pivot pins 88 from the pin openings 90 followed by downward tilting of the legs to raise the lever intermediate portion 92 upwardly clear of the support posts 80 and ultimately forwardly from beneath the lever stops 100. Continued forward movement of the actuating lever 26 results in complete disassembly from both the frame 22 and dispensing mechanism 24 as shown in FIG. 12. The unitary dispensing mechanism 24 and reservoir sump 32 are then removed by depressing a resiliently urged catch 110 on the lower portion of the frame 22 from engagement with this unitary assembly, access for such depression and disengagement being provided by an access opening 112 as shown in FIG. 8. The unitary assembly is then free for upward sliding thereof relative to the frame 22, the sump vertical guides 82 ultimately vertically clearing the frame slots 84 and the unitary assembly being completely free as shown in FIG. 13.

The major components of the dispenser are thereby disassembled from the cabinet 20 and frame 22 for any maintenance operations. For instance, the interior of the cabinet 20, the frame 22, and the actuating lever 26 will, in most cases, merely require cleaning without further disassembly, but the dispensing mechanism 24 may require further disassembly of the cylinder 34 and its described components for both cleaning and any possible seal and spring replacement. The dispenser is assembled by the reverse procedure from that just described.

Referring to FIGS. 14 through 17, a still further improvement for the dispenser of the present invention may be provided, the dispenser embodiment shown therein being identical to that just described with the addition of a selectively adjustable, soap flow control valve 114. The soap flow control valve 114 rotatably telescopes the dispensing mechanism cylinder 34 and is formed with a U-shaped flow opening 116 which may be brought into full registry with the cylinder flow opening 66 or in any partial registry therewith, full registry being shown in FIG. 15 and partial registry in FIG. 16. The purpose of the soap flow control valve 114 is to regulate the automatic rate of refilling of the cylinder 34 between dispensing operations and thereby, with proper adjustment, prevent "milking" of the dispenser, that is, the rapid repeated vertical reciprocation of the actuating lever 26 attempting to dispense large quantities of the soap.

Figure 14:
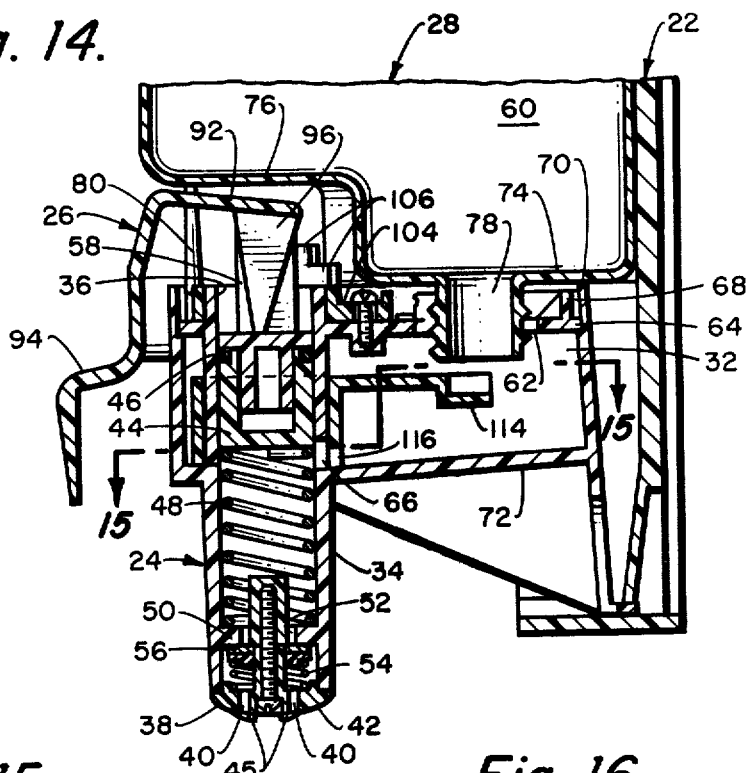
FIG. 14 is a view similar to FIG. 8 of the dispenser with the actuating lever in "at rest" position, but showing the dispenser having adjustment means for selectively controlling the time required between each dispensing operation in order to control "milking" of the dispenser, the dispenser being shown with the adjustment means adjusted for maximum dispensing speed.
Figure 15:
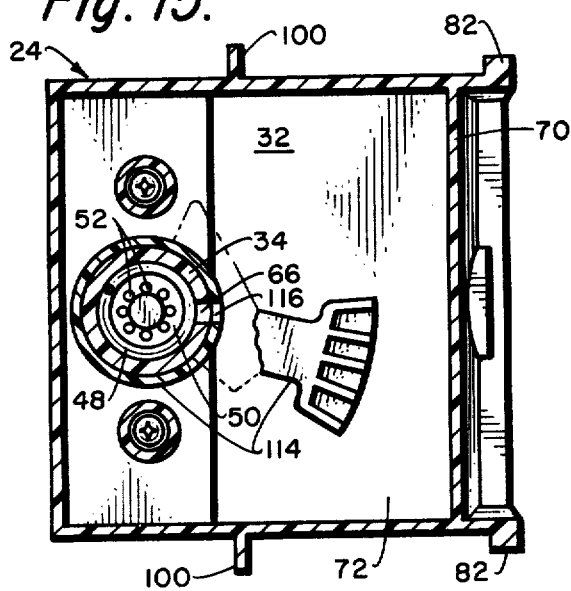
FIG. 15 is a fragmentary, horizontal sectional view looking in the direction of the arrows 15—15 in FIG. 14.
Figure 16:
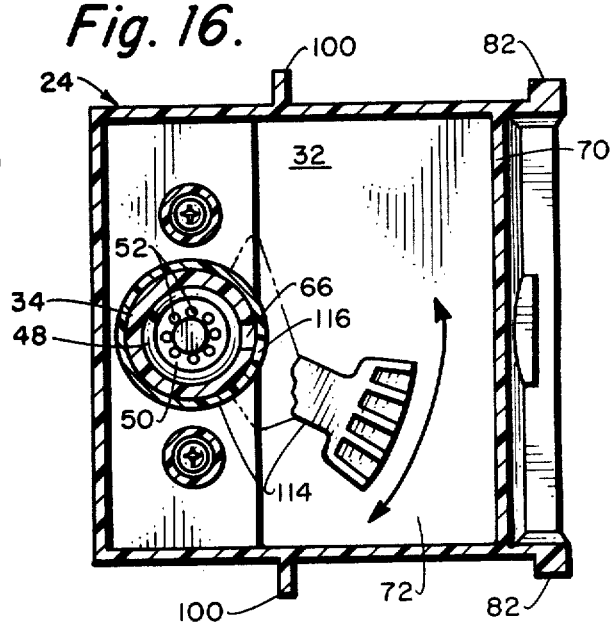
FIG. 16 is a view similar to FIG. 15 but showing the adjustment means for adjusting the time required between dispensing operations adjusted for increasing the time thereof.
Figure 17:
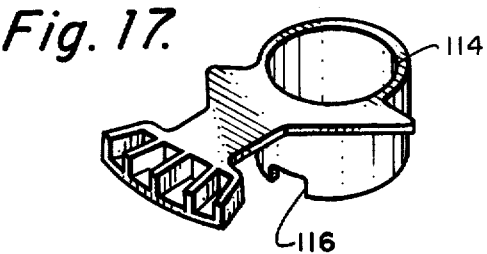
FIG. 17 is a perspective view showing the adjustment means for adjusting the time required between dispensing operations of FIGS. 14 through 16 removed from the dispenser.

As an example, consider the different dispensing rates possible with liquid soap of different viscosities. As previously described, the dispensing mechanism cylinder 34 refills for the next dispensing operation when the actuating lever 26 reaches its upper "at rest" position as shown in FIG. 14, the piston 44 then being primarily above the cylinder flow opening 66 and permitting liquid soap to flow into the cylinder for refilling the same. With the cylinder flow opening 66 fully open, a relatively thick liquid soap will fill the cylinder 34 relatively slowly so that a greater length of time is required between dispensing operations if a full charge of soap is to be dispensed on each operation, but if the soap is relatively thin, the cylinder refilling will be very quick and repeated dispensing operations could be performed with little hesitation between so as to result in "milking".

Thus, with the provision of the soap flow control valve 114, the flow opening 66 through the cylinder 34 may be regulated in size to be compatible with the viscosity of the particular liquid soap being dispensed in order to prevent the unwanted "milking". The wide open positioning of FIG. 15 would be used for the thicker soap and the partially closed positioning of FIG. 16, for instance, would be used for thinner soap. Furthermore, the soap flow control valve 114 is accessible for selected positioning merely by the removal from the dispenser of the reservoir container 60 in the usual manner previously described to expose the valve through the main soap supply opening 62 in the reservoir sump 32.

According to the present invention, therefore, a flowable soap dispenser is provided having various improvements to the components thereof curing particular deficiencies of the prior constructions, one improvement relating to the dispensing or actuating lever 26 manipulated by an operator for each of the dispensing operations of the dispenser. As hereinbefore pointed out, the actuating lever extends generally horizontally forwardly in cantilever extension and the forward hand engaging portion 94 thereof presented to the operator for soap dispensing manipulation is transversely broadened providing an easily and conveniently engaged surface for pivoting the actuating lever during soap dispensing. Additionally and equally important, it will be noted that the actuating lever 26 transmits its downward dispensing force to the dispensing mechanism 24 through the actuating member 96 at the lever intermediate portion 92 which is a lesser distance from the lever pivot pins 88 at the frame 22 than is the forward hand engaging portion 94 of the lever from these pivot pins so as to provide a force multiplying mechanical advantage, that is, less downward force is required at the lever forward hand engaging portion 94 to produce a greater force at the lever intermediate portion 92 into the dispensing mechanism 24. This provides the distinctive advantage of requiring a lesser force by the operator in order to carry out each dispensing operation.

Another important improvement which may be included in the dispenser of the present invention is convenient adjustability for either or both of the quantity of soap dispensed on each dispensing operation or dispensing actuation and the required time interval between dispensing operations. The maximum quantity of soap possible of dispensing on each dispensing operation is determined by the length of downward stroke of the dispensing mechanism piston 44 in the dispensing mechanism cylinder 34 and this length of stroke is, in turn, determined by the length of possible maximum downward stroke of the actuating lever 26 so that the provision of the adjustable lever abutment member 104 with its stepped abutment surface 106 as hereinbefore described supplies a convenient adjustment means for such actuating lever stroke so as to permit lever stroke adjustment selectively limiting or increasing the quantity of soap dispensed on each dispensing operation. As to the time interval required between each dispensing operation, this is determined by the rate of soap flow automatically from the soap reservoir sump 32 into the dispensing mechanism cylinder 34 through the flow opening 66 when the dispensing mechanism piston 44 is at its upper "at rest" position between dispensing operations and by providing adjustability for this flow opening 66 through the provision of the selectively adjustable soap flow control valve 114, this automatic soap flow control rate may be selectively adapted to liquid soaps of different viscosities and thereby minimizing the possible "milking" of the dispenser as hereinbefore discussed.

Still another important improvement which may be provided according to the present invention are several means serving to eliminate certain common inadvertent misuse of the dispenser which can either cause misdirected soap dispensing or unintended soap dispensing. By the provision of the projecting ribs 45 on the lower end surface 42 of the dispensing mechanism cylinder 34 displaced from or intermediate the dispensing openings 40, it is impossible for an operator using the dispenser to completely close off these dispensing openings 40 with a finger or hand surface, the projecting ribs 45 always retaining any abutment surface against the lower end surface 42 of the dispensing mechanism cylinder 34 spaced away from the dispensing openings, for instance, as shown in FIG. 7. The result is that such abutment, the finger or hand of the operator, can never partially or fully close off the dispensing openings 40 which could otherwise cause misdirection for squirting of liquid soap sideways, or prevent soap dispensing entirely. As to inadvertent soap dispensing when not desired, this could occur without one of the improvements of the present invention during removal of a depleted reservoir container 60 constituting the main soap supply and the replacement with a filled container, but with the support post 80 projecting above the actuating lever 26 upon which the reservoir container 60 can rest and pivot during this removal and replacement as shown in FIG. 5, accidental depression of the actuating lever 26 is prevented.

Finally, according to other improvements of the present invention, all of the major components are conveniently removable from the dispenser cabinet 20 for periodic maintenance operations. As hereinbefore described, the reservoir container 60 is easily and conveniently removed when the cabinet 20 is in open position, followed by the actuating lever 26 merely through pivotal disengagement and forward manipulation, finally followed by the unitary reservoir sump 32 and dispensing mechanism 24 merely through upward slideable movement once the catch 110 is selectively released. In this manner, all of these components can be completely separated from the cabinet 20 and are freely separately available for any maintenance operations thereon required, reassembly thereof being just the opposite procedure in the same convenient manner.

We claim:

1. In a dispenser for dispensing flowable soap, and dispenser being of the type having a frame mounting a selectively operable dispensing mechanism for dispensing soap therefrom and a reservoir operably connected to said dispensing mechanism for supplying soap thereto to be dispensed; the combination of: a generally horizontally projecting dispensing lever extending in cantilever fashion and having rearward end means pivotally attached to said frame for selective vertical pivotal movement of said lever in actuating strokes, said lever having at least a part overlying said dispensing mechanism and having actuating means spaced forwardly of said rearward end means and operably connected to said dispensing mechanism for operating said dispensing mechanism during pivotal actuating strokes of said lever; said reservoir including a sump operably connected to said dispensing mechanism for supplying said soap to said mechanism, a selectively removable container positioned on and projecting generally vertically from said sump supplying soap to said sump, said container at least partially overlying said dispensing lever; said dispensing lever extending forwardly between and being selectively vertically pivotal between parts of said container and said dispensing mechanism during said lever pivotal actuating strokes, a forward end of said actuating lever being forwardly exposed of said container and dispensing mechanism accessible for hand engagement to carry out said lever pivotal actuating strokes.

2. In a dispenser as defined in claim 1 in which upward pivotal movement of said dispensing lever in said lever pivotal actuating strokes is limited by stationary stop means upwardly engageable by said lever during said pivotal actuating strokes between said container and said dispensing mechanism preventing lever contact with said container.

3. In a dispenser as defined in claim 1 in which said rearward end means of said dispensing lever includes transversely spaced leg means rearwardly pivotally attached to said frame and forwardly secured to a transversely broadened hand engaging portion of said forward end partially overlying said dispensing mechanism, said lever actuating means being secured to a rearward part of said lever hand engaging portion and projecting downwardly to engage and operate said dispensing mechanism during said pivotal actuating strokes of said lever between said container and said dispensing mechanism.

4. In a dispenser as defined in claim 1 in which stationary support means projects above said dispenser lever engageable by said container at least during insertion and removal of said container effectively preventing said container from pivotally moving said lever and causing inadvertent soap dispensing during said container insertion and removal.

5. In a dispenser as defined in claim 1 in which support means projects above said dispenser lever engageable by said container at least during insertion and removal of said container effectively preventing said container insertion and removal from pivotally moving said lever and causing inadvertent soap dispensing during said container insertion and removal, said support means including at least one stationary post extending generally vertically adjacent said lever.

6. In a dispenser as defined in claim 1 in which support means projects above said dispenser lever engageable by said container at least during insertion and removal of said container effectively preventing said container from pivotally moving said lever and causing inadvertent soap dispensing during said container insertion and removal, said support means including two transversely spaced stationary posts extending generally vertically adjacent said lever and upwardly engaged with said container.

7. In a dispenser as defined in claim 1 in which said dispensing mechanism includes a discharge nozzle with said mechanism being operable for dispensing soap axially through at least one discharge opening in an end of said discharge nozzle; and in which said nozzle end has a generally radial outer surface forming axial termination of said discharge opening and projection means extending axially from said generally radial outer surface radially displaced from said discharge opening for preventing blocking of said discharge opening and permitting said soap axial dispensing even though a generally radial abutment may be placed axially against said nozzle end such as an operator's finger which would otherwise close off said discharge opening.

8. In a dispenser as defined in claim 1 in which said dispensing mechanism contains a constant quantity refillable soap volume normally discharged by each selected operation of said dispenser, said reservoir sump supplying soap to said dispensing mechanism to refill said constant quantity soap volume, a flow opening formed between said reservoir sump and said dispensing mechanism automatically directing a flow of soap from said sump to said mechanism at least between said selected operations of said dispenser for said refilling; and in which flow opening valve means at said flow opening is selectively adjustable for selectively closing off greater or lesser portions of said flow opening to decrease or increase timed rate of soap flow between said reservoir sump and said dispensing mechanism and thereby extend or shorten the time required for the dispensing mechanism to be refilled and thereby receive said constant quantity refillable soap volume.

9. In a dispenser for dispensing flowable soap, said dispenser being of the type having a dispensing mechanism containing constant quantity refillable soap volume normally discharged by each selected operation of said dispenser, a reservoir for supplying soap to said dispensing mechanism to refill said constant quantity soap volume and a flow opening formed between said reservoir and said dispensing mechanism automatically directing a flow of soap from said reservoir to said mechanism at least between said selected operations of said dispenser for said refilling; the combination of: flow opening valve means at said flow opening selectively adjustable for selectively closing off greater or lesser portions of said flow opening to decrease or increase timed rate of soap flow between said reservoir and dispensing mechanism and thereby extend or shorten the time required for the dispensing mechanism to be refilled and thereby receive said constant quantity refillable soap volume; said dispensing mechanism including a cylinder having said constant quantity refillable soap volume therein with said flow opening being formed through a side of said cylinder; said valve means at said flow opening being outward of said side of said dispensing mechanism cylinder and being rotatably mounted on said cylinder side at least partially within said reservoir.

* * * * *